INVENTORS
JOHN CHESNEY
VINCENT P. FRIBERG
RICHARD B. PHELPS
BY
James and Franklin
ATTORNEY March 10, 1970  J. CHESNEY ET AL  3,500,366
MONITORING SYSTEM FOR FLUID FLOW IN DROP FORM
Filed Oct. 3, 1966  4 Sheets-Sheet 3

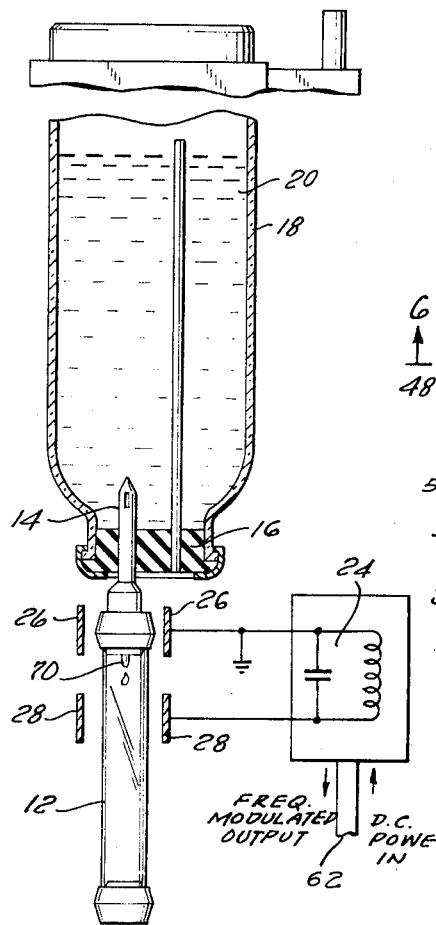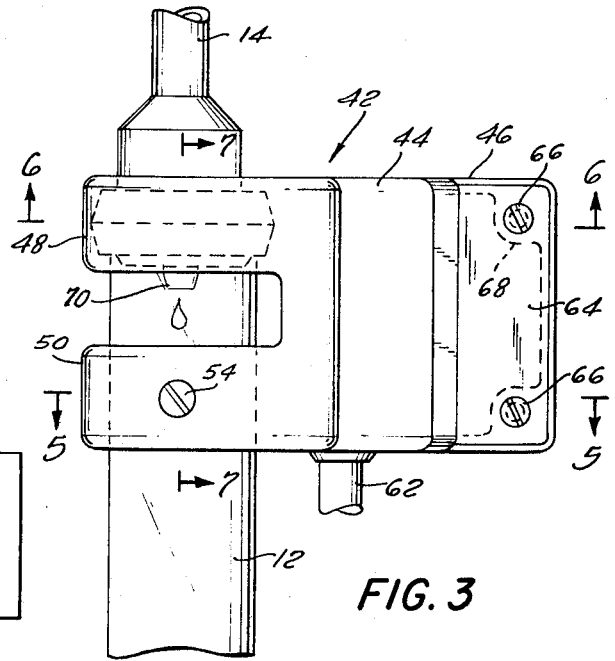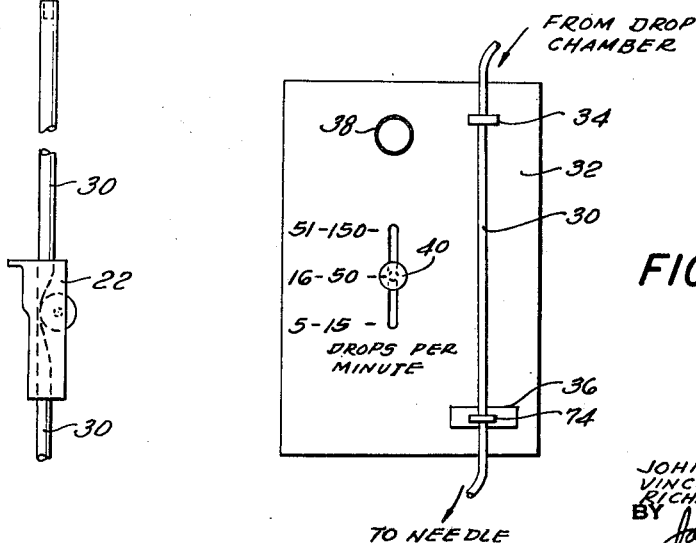

INVENTORS
JOHN CHESNEY
VINCENT P. FRIBERG
RICHARD B. PHELPS
BY
James and Franklin
ATTORNEY United States Patent Office 3,500,366
Patented Mar. 10, 1970

3,500,366
MONITORING SYSTEM FOR FLUID FLOW IN DROP FORM
John Chesney, Roselle Park, Vincent P. Friberg, Leonia, and Richard B. Phelps, New Milford, N.J., assignors to General Instrument Corporation, Newark, N.J., a corporation of Delaware
Filed Oct. 3, 1966, Ser. No. 583,665
Int. Cl. G05b; G08b 21/00, 13/00
U.S. Cl. 340—222
21 Claims

ABSTRACT OF THE DISCLOSURE

The present drop monitor is designed for use with a conventional drop chamber, the monitor comprising a radio frequency oscillator having a resonant circuit, with two electrodes spaced apart axially along the outside of the drop chamber and coupled to the resonant circuit. Downward passage of a drop frequency modulates the FM oscillator output, and a detector demodulates the frequency modulation to produce electrical pulses as a measure of the drop rate. The circuitry is responsive to an error in the drop pulse rate to cause an alarm operation, and also to operate a shut-off mechanism which stops flow through the usual flexible tube leading from the drop chamber to a hollow needle. The electrodes are preferably carried by a clamp assembly with jaws which are readily spread apart by handles, and then clamped resiliently about the drop chamber, the said jaws carrying the spaced electrodes.

This invention relates to a system for monitoring the flow of fluid drops, and particularly the monitoring of infusion and transfusion procedures.

The general object of the invention is to improve on the apparatus disclosed in a pending application Ser. No. 489,844 entitled Monitoring System for Fluid Flow in Drop Form, filed Sept. 24, 1965, since issued July 2, 1968 as Patent No. 3,390,577.

The said application explains the need for measuring the rate of drop formation in medical procedures such as intravenous infusion. Personal monitoring by a nurse over a long period of time is difficult, in view of the shortage of available nurses.

In said Patent No. 3,390,577 an electrical signal of predetermined character is electrically coupled to the main body of fluid from which the drops are to be formed. As a drop forms another coupling picks up some of the signal, which varies in one sense as the drop grows, and when the drop falls it varies abruptly in opposite sense. This variation impresses an amplitude modulation upon the signal, which modulation is detected by a detecting means, and the interval or frequency of modulation represents the interval or frequency of drop formation.

In applying the said prior invention some difficulty was found because of the great variations in size of the source or bottle carrying the main body of fluid, and one object of the present invention is to provide a system which is independent of the main body of fluid, and which instead is localized at the drop chamber. Another object is to apply electrodes around the drop chamber which form a part of the capacitance of the resonant circuit of an oscillator, the drops then causing a frequency modulation rather than an amplitude modulation, which modulation then may be detected by one of the known frequency modulation detectors.

The resulting pulses are preferably used to discharge a capacitor provided with a resistive circuit affording discharge at a desired rate, and the failure or slowing of drops causes the building up of an excessive charge on the capacitor, which in turn energizes an alarm system. A different desired drop rate may be accommodated by simply varying the leakage or discharge rate from the capacitor. Additional means are provided whereby an excessive drop rate also operates the alarm, as by interrupting the supply of pulses to the capacitor.

Further objects of the invention center about convenient means for readily applying the electrodes to any of a large number of conventional drop chambers, for which purpose we employ a clamp assembly with jaws dimensioned to be readily spread apart by handles, and to be clamped resiliently about the drop chamber, said jaws carrying electrodes which are spaced apart axially along and outside of the drop chamber. There may be upper and lower pairs of jaws, but preferably operated by a single pair of handles, and in accordance with a further feature and object of the invention, one of the handles is hollowed to form a housing which receives the oscillator components, these being appropriately miniaturized.

In the event of complete drainage of liquid through the needle (sometimes referred to as "going to air") it is necessary to remove the needle and to insert another. This inconvenience is avoided if the flexible tube and needle remain filled with liquid, and accordingly a further object of the present invention is to provide shut-off means to clamp the flexible tube between the drop chamber and the needle in the event of failure or error in the drop rate. The tube may be rubber, but usually is a flexible plastic such as polyethylene. The shut-off mechanism may itself close an alarm switch, and the latter is preferably adapted for connection to a conventional hospital nurses' call board in order to call attention to the shut-off.

The shut-off mechanism preferably further comprises a power switch which is connected in the power supply for the oscillator and detection circuitry, this switch being opened by operation of the shut-off means, thereby deenergizing the circuitry until it is again put into use. The shut-off and alarm mechanism may be and preferably are so designed as to operate also in the event of an electrical power failure, the alarm then calling attention to the power failure as well as to the shut-off.

To accomplish the foregoing general objects, and other more specific objects which will hereinafter appear, our invention resides in the drop monitor system and the elements thereof, and their relation one to another, as are hereinafter more particularly described in the following specification. The specification is accompanied by drawings in which:

FIG. 1 is a vertical section showing a typical drop chamber and drop rate adjustment valve;

FIG. 2 is a front elevation showing the panel of a box containing the power supply and electrical detection circuitry and a shut-off valve;

FIG. 3 is a front elevation of a clamp unit which is readily applied to most conventional drop chambers, and which carries the oscillator and electrodes;

Figure 4:
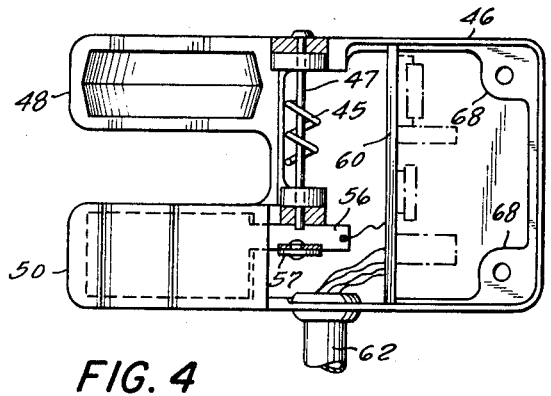
FIG. 4 is a vertical section through the clamp unit taken approximately on the line 4—4 of FIG. 5.
Figure 5:
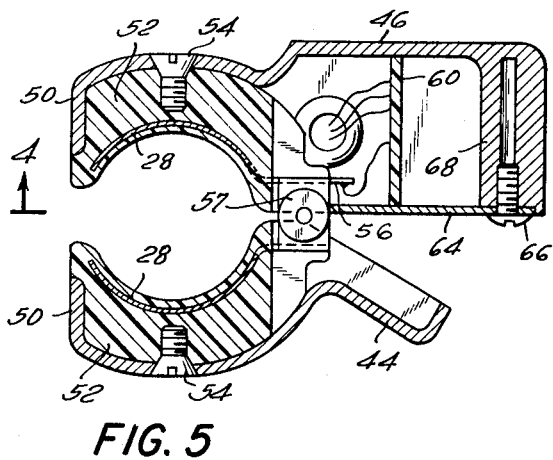
FIG. 5 is a horizontal section taken approximately on the line 5—5 of FIG. 3.
Figure 7:
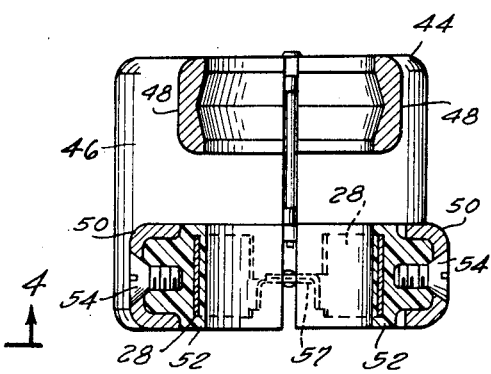
FIG. 7 is a vertical section taken approximately on the line 7—7 of FIG. 3.

Referring to FIG. 1 of the drawing, the drop monitor is used with a drop chamber 12 which may be conventional. It comprises a drip tube 14 connected at 16 to a bottle or source 18 of fluid 20 which is being given to a patient, typically through a needle (not shown) by intravenous infusion. The drop rate is adjusted to desired value by means of a valve such as that indicated at 22. This may be disposed above the drop chamber, but usually is located below the drop chamber as here shown. It squeezes the tube 30 a desired amount.

In accordance with the present invenion the monitor comprises a radio frequency oscillator having a resonant circuit 24 and electrodes 26 and 28 which are spaced apart axially along the outside of the drop chamber, and which are coupled to and indeed form a part of the resonant circuit. The formation and subsequent breaking away and passage of the drop through the drop chamber modulates the frequency of the oscillator output, and this output is supplied through a cable generally designated 62 to frequency modulation detection circuitry which further includes means responsive to an error in the drop rate to energize an alarm and/or to operate shutoff means, and/or other useful functions such as shutting off the power supply to the electronic circuitry. The cable 62 also has conductors which supply DC power to the oscillator.

Referring now to FIG. 2, the flexible tube leaving the valve (valve 22 in FIG. 1) and leading to the needle, is indicated at 30. It is preferably located directly in front of the control panel 32 of a small housing containing the power supply and detection circuitry. The housing may be carried by the same post that carries the bottle 18, but at a lower height. The panel 32 may have a hook 34, and a pair of notched slides at 74 forming part of a shut-off mechanism 36, the tube 30 being readily engaged laterally behind the hook 34 and in the slides 36. The lower end of tube 30 then continues to a needle (not shown) which is inserted in the patient, for example, in a vein.

Panel 32 may have a pilot light 38 to indicate when the circuitry is in operation, and an adjustable knob or lever 40 which is used to adjust the circuitry for the drop rate being used, as set by valve 22 in FIG. 1.

The system functions by sensing the capacitance between the drop and an electrode which is clamped around the drop chamber. This capacitance varies as the drop is formed and subsequently falls. The electronic circuitry develops a pulse for each drop. The system has the advantage of being insensitive to tilting of the drop chamber, and to extraneous light sources. Its pick-up head is clamped on the drop tube or chamber only. It therefore accommodates a wide range of intravenous equipment of different design and manufacture.

In accordance with features and objects of the present invention, no connection to the bottle itself is required; the head contains a transistorized oscillator circuit; and carries the two electrodes which are clamped around the drop tube. One electrode is grounded and the other electrode is the "hot end" of the oscillator tank. As the drop forms and subsequently falls, the capacitance from the hot electrode to ground varies, and as a result the frequency of the oscillator fluctuates. The oscillator signal is conveyed through a shielded cable (62 in FIGS. 1 and 3) to the monitor proper (behind panel 32 in FIG. 2) in which is located a ratio detector which generates an audio pulse for each drop which falls. Subsequently, this pulse is amplified, and we effectively measure the interval between succeeding pulses (or drops). If this interval is too long the alarm is actuated and a solenoid valve (36 in FIG. 2) clamps the tube 30 below the drop chamber. As a result, even when the bottle (18 in FIG. 1) empties, the liquid in the drop chamber 12 does not empty, and the nurse may renew the bottle without making another needle insertion.

Figure 6:
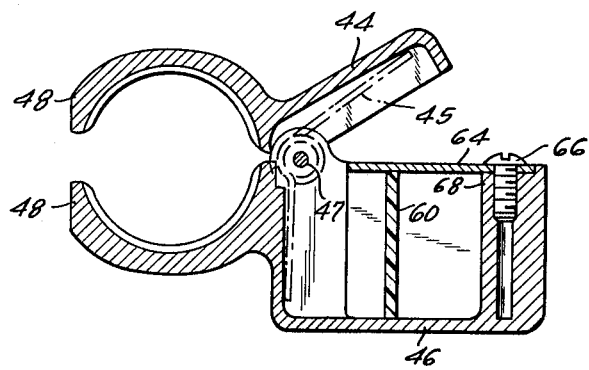
FIG. 6 is a horizontal section taken approximately on the line 6—6 of FIG. 3.

Referring now to FIGS. 3–7 of the drawing, we provide a clamp assembly generally designated 42, and having handles 44 and 46 which operate a pair of upper jaws 48 and a pair of lower jaws 50. These jaws act as or carry the electrodes which were indicated schematically at 26 and 28 in FIG. 1. A single pair of handles is preferably cast integrally with the jaws, using a conductive metal such as aluminum. The handles then operate both pairs of jaws simultaneously, and also serve to space them apart axially by a fixed distance. The design of the jaws is such as to accept a wide range of variation in the diameter of the drop chamber. The jaws normally closed by a torsion spring 45 (FIG. 4) located on pivot 47. FIG. 6 shows the spring 45 in broken lines.

The upper jaws 48 (FIGS. 4, 6 and 7) are conductive and are clamped directly about the drop chamber. The lower jaws 50 embody arcuate blocks of insulation material 52 (FIGS. 5 and 7) which blocks are received in the enlarged hollow jaws 50, and are secured therein by means of short screws 54. The lower electrodes 28 are carried by the insulation blocks 52, thereby insulating the same from the upper jaws 48. In the construction here shown the electrodes 28 are embedded in the insulation material at the time the material is molded. The electrodes have tails or soldering lugs 56 for electrical connection to the oscillator. They may have ears 57 which are pivoted on the hinge axis, in which case connection to one soldering lug will suffice.

One handle, in this case the handle 46, is enlarged to house the oscillator. The components of the oscillator are suggested in broken lines in FIG. 4, and may be mounted on a printed circuit board 60 which is secured in the housing. The upper electrodes 48 are grounded, and the lower electrodes are connected at tail 56 to the oscillator. A cable 62, preferably a shielded cable of suitable length, say four feet, extends from the clamp to the circuitry located behind the panel 32 in FIG. 2. The shield of cable 62 may be grounded directly to the metallic body of the clamp. The hollow handle 46 may be closed by a small cover plate indicated at 64 in FIG. 3 and FIG. 6, and held in position by two screws 66 recieved in corner enlargements 68. The cover plate 64 and screws 66 have been omitted in FIG. 4.

The location of the clamp on the drop chamber is not critical, but best results are found when the upper electrode is at or above the point of drop formation, (the nozzle tip 70 in FIGS. 1 and 3). There then is a gradual change of capacitance as the drop forms, and an abrupt change as the drop falls. It will be understood that the upper jaws may be shaped to carry the insulated electrodes, instead of the lower ones as here preferred.

The shut-off mechanism which is located at the point 36 in FIG. 2, may be described in greater detail with reference to FIGS. 8 through 13 of the drawing. It comprises a pair of superposed slides 72 and 74 which are longitudinally movable relative to the fixed frame 36, and relative to one another. The slides are notched at 76 (FIGS. 8 and 9) to receive the flexible tube 30 which leads to the needle. There is a resilient means, in this case a pull spring 78, which urges one slide, in this case the lower slide 74, to move relative to slide 72 in order to clamp and thereby stop flow through the tube, as shown in FIG. 11 in which the tube 30 has been flattened and closed, and which may be compared to FIG. 10 in which the tube is round and open.

Figure 9:
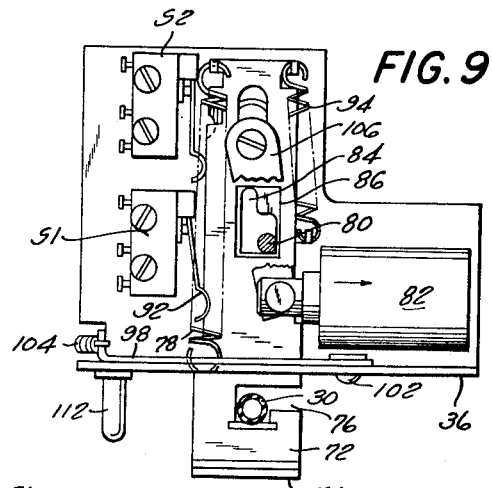
FIG. 9 is a similar view with the slides pushed into starting position.
Figure 12:
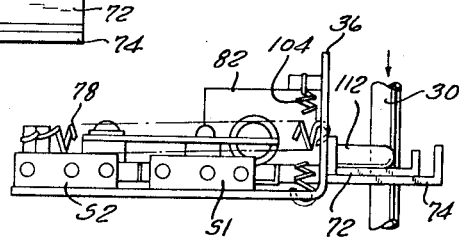
FIG. 12 is a side view of the shut-off mechanism.
Figure 10:
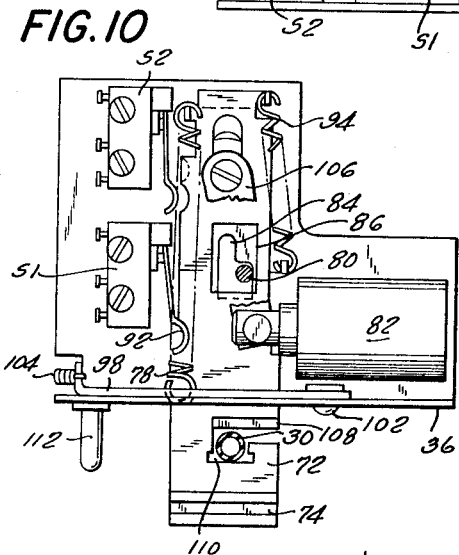
FIG. 10 is a similar view with the slides in running position.
Figure 11:
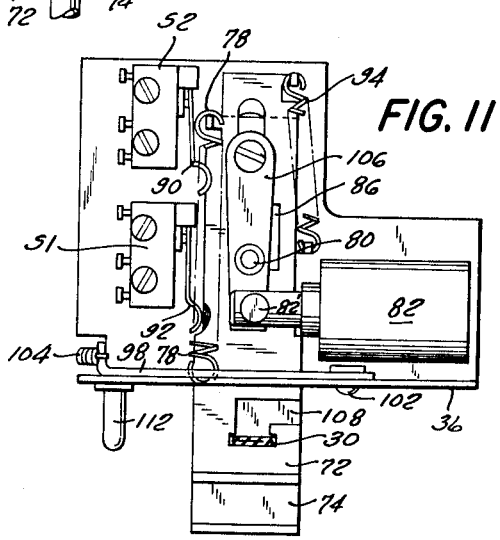
FIG. 11 is a similar view with the slides in shut-off position.
Figure 13:
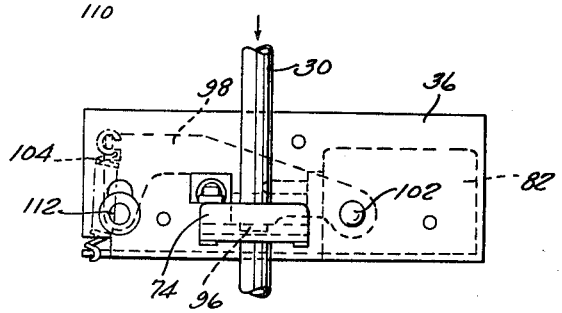
FIG. 13 is a front view of the shut-off mechanism.

There is also a stop means, more specifically a pin 80, which arrests movement of slide 74, and an arm 106 and a solenoid 82 which controls the stop 80, and which is so energized from the detection circuitry that an error in the desired drop rate causes movement of stop 80 to a position which permits movement of slide 74 from the running position shown in FIG. 10 to the shut-off position shown in FIG. 11. For this purpose slide 74 has a somewhat L-shaped opening indicated at 84 in FIGS. 9 and 10, and slide 72 has a large clearance opening indicated at 86, the opening 86 being provided merely to pass the stop pin 80 down to the L-shaped opening 84. The solenoid 82 is normally energized, and when deenergized its core moves from the stop position shown in FIGS. 9 and 10, to the release position shown in FIGS. 8 and 11.

The shut-off also operates two electrical switches. One is a warning switch $S_2$, preferably of the precision or microswitch type. This switch is normally open, but when slides 72 and 74 are in the shut-off position shown in FIG. 11, the follower arm 90 moves into two registering notches in the two slides, thus closing the switch. The switch is preferably adapted for connection to a conventional hospital nurse's call board, and so calls attention to the shut condition of the infusion apparatus.

The other switch is a normally closed power switch indicated at $S_1$. This has an arm 92 which is in a notch in slide 74, with the switch in closed condition in FIGS. 9 and 10, but the arm 92 is moved to open position in FIGS. 8 and 11, thus deenergizing the power supply to the circuitry when the liquid supply is shut off as in FIG. 11, or when the system is not yet in use, as in FIG. 8.

Figure 8:
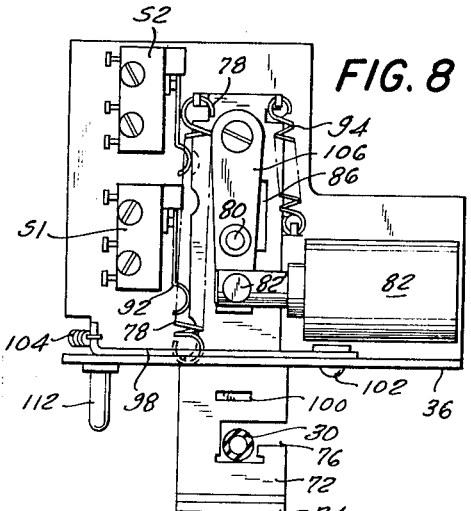
FIG. 8 is a plan view of the shut-off mechanism, with the slides in idle position.

Considering the mechanism in greater detail, the slide 72 is also pulled forward by another pull spring indicated at 94. Both slides are all the way forward when the apparatus is idle, as shown in FIG. 8. When the needle has been inserted and the drop rate has been adjusted, the tube 30 is readily slid into the notches 76, and the upwardly turned front flanges of the slides may be pushed rearward to start the operation, as shown in FIG. 9. In this rearward position, a downwardly projecting tooth 96 (FIG. 13) on a latch arm 98 moves into a detent slot 100 (FIG. 8) and holds the slide 72 in the rearward position shown in FIGS. 9, 10 and 11. The latch arm 98 is pivoted at 102, and is normally urged downward by a generally upright pull spring 104.

When the slides are pushed inward as shown in FIG. 9, the switch $S_1$ is closed because its arm 92 moves into a notch in the upper slide, and the lower slide is cut away. This energizes the circuitry, including the solenoid 82 the core of which is pulled inward, thereby turning the arm 106 toward the right, as shown by the change from FIG. 8 to FIG. 9. This moves the stop pin 80 into the locking part of the L-shaped slot 84. However, there is still clearance for some forward movement, next described.

In FIG. 10 the finger pressure on the slides has been released after pushing them rearward, whereupon pull spring 78 moves the lower slide 74 forward somewhat, for the purpose of anchoring the tube 30 against escape. This takes place because the part 108 of slide 74 moves forward and partly closes the notch 76, thereby holding the tube 30 against escape from the enlarged inner portion 110 of the notch. The slide 74 and its part 108 cannot move further forward because the slide is restrained by the stop 80, as shown in the drawing.

When the drop rate is wrong the solenoid 82 is deenergized, and its internal spring (or the spring 78 will suffice if opening 84 is suitably shaped) moves its plunger outward, thus moving the arm 106 and the stop 80 to the left as shown in FIG. 11, whereupon the lower slide 74 is pulled all the way forward by spring 78, so that part 108 clamps the tube 30 flat or closed as shown in the drawing.

When a nurse reaches the patient she raises the projecting end of a finger piece 112, thereby raising the latch lever 98, and so releasing the upper slide 72, which then moves all the way forward to the idle position shown in FIG. 8. At this time switch $S_1$ is still open, and switch $S_2$ is also opened to terminate the call on the nurse's call board.

Usually she will restart the mechanism, typically after replenishing the bottle of infusion liquid. When she then pushes the slides inward to the starting position shown in FIG. 9, the switch $S_1$ is closed; the switch $S_2$ remains open; the solenoid 82 is energized; and the slides are latched. The tube 30 is opened for resumed flow. Finger pressure on the slides is released, and they then anchor the tube in position as shown in FIG. 10.

Figure 14:
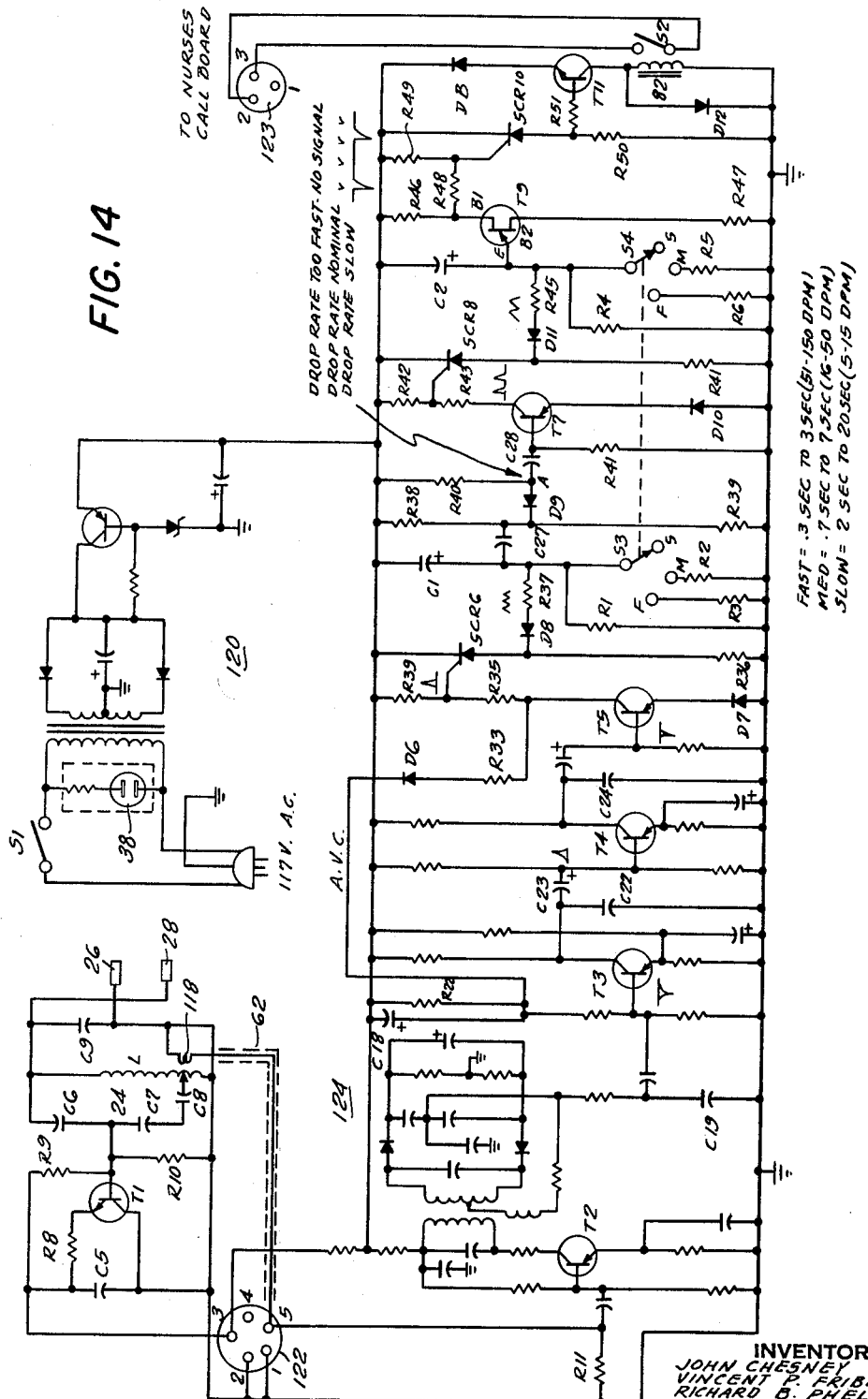
FIG. 14 is an electrical diagram of the apparatus.

The circuitry is shown in the electrical diagram of FIG. 14. The upper and lower electrodes are indicated at 26 and 28. The oscillator centers about a transistor T1, and its tank circuit is indicated at 24. This is coupled by a coil, in this case a single loop 118, and thence through the shielded cable 62 to the detection circuitry. The power supply is generally designated 120, and includes the indicating lamp or pilot light 38 previously referred to. The power switch is shown at $S_1$ (top center of the diagram) and the warning switch at $S_2$ (lower right of the diagram). The oscillator cable preferably is detachably connected to the detection circuitry, in this case through a five prong connector indicated at 122. The warning switch $S_2$ may be connected to the nurses' call board by a connector 123. The shut-off solenoid is shown at 82.

The oscillator in this case operates at 10.7 mc., which may be referred to conveniently as the radio frequency. This is amplified in an amplifier stage centering around transistor T2. The frequency modulation is detected by a ratio detector located beneath numeral 124, the output of which is a series of pulses corresponding to the drops, and analogous to an audio frequency. Such a pulse is depicted at the base of transistor T3. This pulse is amplified by each of three transistors T3, T4 and T5 in cascade. It appears in amplified form and as a positive pulse for each drop, at the input terminal or gate of a silicon controlled rectifier SCR 6.

Upon the falling of each drop, the SCR 6 discharges a 50 $\mu$f. tantalum capacitor C1. This develops a sawtooth signal at the plus terminal of the capacitor. If the drop interval is short (drop rate high) the sawtooth is of smaller magnitude than if the drop interval is great. The signal which subsequently appears at the point A is determined by the magnitude of the sawtooth.

If the drop rate is too fast, no signal at all appears at point A because diode D9 is biased "off" (non-conductive) by voltage developed at the junction of resistors R38 and R39. The sawtooth signal developed is less than the bias potential and therefore does not get through the diode D9. As a result the 100 $\mu$f. tantalum capacitor C2 is permitted to charge to a potential which will allow it to discharge through a unijunction transistor T9, subsequently firing the silicon controlled rectifier SCR 10, and cutting off transistor T11, and thereby deenergizing the solenoid 82, and activating the warning system by closing switch $S_2$.

Unijunction transistor T9 acts as an oscillator with a period depending on the selection of resistor R4, R5 or R6 working together with the capacitor C2. This oscillator is adjusted for a period longer than the desired drop interval. If the drop rate is correct, a pulse through transistor T7 fires SCR 8, which discharges capacitor C2 before the unijunction transistor T9 fires itself. The capacitor C2 is thus discharged at the firing of each drop.

If the drop rate is too slow when the unijunction transistor T9 fires itself, and this fires SCR 10, whereupon transistor T11 is cut off, and thus deenergizes solenoid 82.

A double-pole three-position switch $S_3$, $S_4$ sets the time constants for charging both the capacitor C1 which determines the fast limit, and the capacitor C2 which determines the slow limit. The dotted line represents the single control for switches $S_3$ and $S_4$.

A control for the rate selector switches $S_3$, $S_4$ is available on the front panel, as shown at 40 in FIG. 2. There are three positions, which in this case are as follows:

"5–15 Drops per Minute"—At this setting the system warns if the drop interval is less than two seconds or greater than twenty seconds.

"16–50 Drops per Minute"—At this setting the system warns for a drop interval of less than 0.7 seconds and greater than seven seconds.

"51–150 Drops per Minute"—At this setting the system warns when interval is less than 0.3 seconds or greater than three seconds.

In FIG. 14 the three positions are marked "S," "M" and "F" for slow, medium and fast. The above time ranges for acceptability versus warning have been selected as being reasonable, but of course, other limits might be chosen.

For the slow drop rate the charge of capacitor C1 is through resistor R1 having a value of 120K ohms. For medium drop rate the charge is through resistors R1 and R2 in parallel, the resistor R2 having a value of 56K ohms. For the fast drop rate the charge is through resistors R1 and R3 in parallel, the resistor R3 having a value of 15K ohms.

The capacitor C2 is similarly charged through either resistor R4, or resistors R4 and R5 in parallel, or resistors R4 and R6 in parallel. The resistor R4 has a value of 220K ohms, the resistor R5 has a value of 100K ohms, and the resistor R6 has a value of 33K ohms. It will be understood that these values are given by way of example, and not in limitation of the invention. In fact, as previously indicated, even the selection of the drop rate ranges is an arbitrary selection. It is evident that switches having more than three positions may be used, and indeed continuously variable potentiometers may be used, for adjustment of the charge rate of the capacitors.

In FIG. 14 a conductor marked AVC provides automatic gain control in the amplifier. This compensates for change in signal amplitude, as for example caused by change in drop size. The drop size used for an adult is larger than that used for a baby, and the latter requires more than in the amplifier. Also the coupling to one type of drop chamber may be better than to another type. Moreover, one liquid, e.g. a saline liquid, may give a greater signal than another, e.g. a dextrose solution.

Quantitative values of some of the components in FIG. 14 may be given as follows, but it will be understood that these are given merely by way of example, and are not intended to be in limitation of the invention.

The power supply unit 120 is a standard 12 volt supply of conventional design and requires no detailed description.

The oscillator head or clamp centers about a transistor T1 which is a type SE 5002. The capacitors C5, C6, C7, C8 and C9 have values of 820 pf., 5 pf., 27 pf., 820 pf. and 10 pf., respectively. Resistors R8, R9 and R10 have values of 3.3K, 10K and 8.2K ohms, respectively. The inductor L has a value such as to resonate with the capacitor C9 and the electrodes at a frequency of about 10.7 mc. The capacitance is kept small so that it will be sensitive to the change in capacitance caused by the drop formation. The pick up coil 118 has a single turn.

The radio frequency amplifier stage based on the transistor T2 is conventional. The resistor R11 is chosen to approximately match the impedance of the cable 62, and in the present case is 68 ohms.

Also the FM detector or ratio detector at 124 is conventional and needs no detailed description of its components.

The audio amplifier centering about the transistors T3, T4 and T5 may be conventional and may use the usual components. The AVC loop uses an increase in the output of T5 to decrease the gain in T3. The loop comprises a resistor R33 which is 1000 ohms, a diode D6 which is a silicon diode for low leakage, a capacitor C18 which is 100 μf., and a resistor R22 which is 150K ohms.

Capacitors C19, C22, and C24 act as a low pass filter to minimize unwanted signals, and have values of 0.1 μf., 0.05 μf., and 0.1 μf., respectively.

The silicon controlled rectifiers SCR 6, SCR 8 and SCR 10 are type C6F. The transistor T7 is a type 2N508. Transistor T11 is a type 2N1302. The unijunction transistor T9 is a type T1S43. The diodes D6, D7, D8, D9, D10, D11, D12 and D13 are all type 1N4383 or 1N2069. Resistors R36, R37, R38, R39, R40, R41, R42, R32, R44, R45, R46, R47, R48, R49, R50 and R51 are respectively 100K ohms, 33 ohms, 100K ohms, 1.5 megohms, 100K ohms, 33K ohms, 470 ohms, 470 ohms, 100K ohms, 33 ohms, 100 ohms, 1.2K ohms, 1K ohms, 1K ohms, 1.5K ohms and 1.5K ohms, respectively.

The capacitor C27 has a value of 0.47 μf. The capacitor C28 has a value of 0.2 μf. The solenoid 82 has a resistance of about 150 ohms, and draws 80 milliamperes current.

It is believed that the construction and operation and method of use of our improved monitoring system, as well as the advantages thereof, will be apparent from the foregoing detailed description.

For the nurse, the operation is rather simple. After the infusion bottle and drop chamber and tubing are set up as usual, the nurse need merely apply the clamp to the drop chamber; plug the power line into a wall outlet; connect the clamp to the monitor by means of the detachable connector 122 if not previously connected; connect the alarm switch to the nurses call board by means of the connector 123; adjust the drop rate by means of the valve 22 (FIG. 1) in usual fashion; set the rate knob 40 (FIG. 2) to the appropriate drop rate range; and then push the slide 74 (FIGS. 2 and 8–13) inward to start the monitoring operation. The setting of the rate knob 40 determines that interval between successive drops which is treated as a failure by the circuitry, all as discussed above in greater detail.

An FM system with a ratio detector is relatively immune to "noise" or interference caused by other electrical equipment in the hospital. A higher gain or more sensitive system may be used, which in turn reduces the size needed for the clamp electrodes, and adaptability to difficult shapes and sizes of drop chamber; and different liquids used.

The system warns the nurse and clamps the infusion needle supply tube when the flow of drops stops for any reason. Additional needle insertion is avoided. The system is simple to apply and to operate. It is substantially fail-safe, because a power failure results in warning and shut-off. It does not take away from the nurse her responsibility for setting up the intravenous equipment and for adjusting the drop rate, using the time-proven conventional method. This fact helps secure acceptance by the medical and nursing professions.

The clamp or head can be used on a wide variety of intravenous gear of different design and manufacture, because the head clamps solely on the drop chamber. It warns if the flow rate is too slow, and also if it is too fast. In all cases there is a local warning as well as a remote warning, because the local pilot light is shut off.

Although the device as illustrated is powered from a standard 117 volt AC line, the internal circuitry operates at 12 volts DC, and therefore with no basic modification will function in the field (as for military use) using a 12 volt storage battery or automobile battery for power. The power consumption is low, being less than 1.5 watts with battery operation.

The system prevents the drop chamber from emptying with the system going "to air." At the same time the monitor shuts itself off, and triggers a warning at a remote point, and provides a local warning. The device also clamps the tubing and warns the nurse in the event of power failure, and therefore is substantially "fail safe."

It will be understood that while we have shown the invention in a preferred form, changes may be made without departing from the scope of the invention. In the claims the reference to causing "an alarm operation" applies also to causing a shut-off.

We claim:

1. A drop monitor for use with a drop chamber, said monitor comprising a frequency oscillator having a resonant circuit, electrode means operatively connected to said drop chamber and effective to form a capacitance element which is variable with the passage of drops through said drop chamber, said electrode means being electrically connected as a part of said resonant circuit such that the variation in the capacitance element due to the passage of drops through said chamber modulates the output of said oscillator, means for detecting the occurrence of modulation of said oscillator output and causing an alarm operation in response to a detected deviation of the modulation occurrence from a predetermined norm.

2. A drop monitor as defined in claim 1, in which passage of a drop modulates the frequency of the oscillator output, and in which the detector is a frequency modulation detector.

3. A drop monitor as defined in claim 1, comprising a clamp assembly with handles and jaws dimensioned to be readily spread apart and then clamped resiliently about a drop chamber, said jaws carrying the aforesaid electrodes which are spaced apart axially along and outside the drop chamber, there being a pair of upper jaws which are conductive and are clamped directly about the drop chamber, and a pair of lower jaws embodying insulation material and carrying electrodes which are insulated from the upper jaws, a single pair of handles for axially spacing and for simultaneously spreading the upper and lower jaws, and resilient means normally closing said jaws.

4. A drop monitor as defined in claim 1, comprising a clamp assembly with handles and jaws dimensioned to be readily spread apart and then clamped resiliently about a drop chamber, said jaws carrying electrodes which are spaced apart axially along and outside the drop chamber, one of said handles being enlarged and acting as a hollow housing receiving the oscillator components, and a cable extended from said housing to the aforesaid electronic detection circuitry.

5. A drop monitor as defined in claim 1, comprising a clamp assembly with handles and jaws dimensioned to be readily spread apart and then clamped resiliently about a drop chamber, said jaws carrying the aforesaid electrodes which are spaced apart axially along and outside the drop chamber, there being a pair of upper jaws which are conductive and are clamped directly about the drop chamber, and a pair of lower jaws embodying insulation material and carrying electrodes which are insulated from the upper jaws, a single pair of handles for axially spacing and for simultaneously spreading the upper and lower jaws, resilient means normally closing said jaws, one of said handles being enlarged and acting as a hollow housing receiving the oscillator components, and a shielded cable extended from said housing to the aforesaid electronic detection circuitry.

6. A monitor system as defined in claim 17, in which the shut-off mechanism includes a warning switch which is normally open, but which is closed when the shut-off mechanism is operated to close the flexible tube, said warning switch being adapted for connection to a conventional hospital nurses call board to call attention to the shut-off.

7. A monitor system as defined in claim 17, in which the shut-off mechanism comprises a power switch which is connected in the power supply for the oscillator and detecting means of the monitor system, and means whereby operation of the shut-off mechanism to close the flexible tube opens the power switch and thereby deenergizes the circuitry.

8. A monitor system as defined in claim 17, in which the shut-off mechanism includes a warning switch which is normally open, but which is closed when the shut-off mechanisms is operated to close the flexible tube, said warning switch being adapted for connection to a conventional hospital nurses callboard to call attention to the shut-off, and in which the shut-off mechanism further comprises a power switch which is connected in the power supply for the oscillator and detecting means of the monitor system, and means whereby operation of the shut-off mechanism to close the flexible tube opens the power switch and thereby deenergizes the circuitry.

9. A monitor system as defined in claim 17, in which the shut-off mechanism includes a warning switch which is normally open, but which is closed when the slides are moved to close the flexible tube, said warning switch being adapted for connection to a conventional hospital nurses' callboard to call attention to the shut-off, and in which the shut-off mechanism further comprises a power switch which is connected in the power supply for the oscillator and detecting means of the monitor system, and means whereby movement of the slides to close the flexible tube opens the power switch and thereby deenergizes the circuitry.

10. A drop monitor as defined in claim 1, further comprising a shut-off mechanism operable on flexible tubing leading from the drop chamber to a hollow needle, said shut-off mechanism comprising a pair of superposed slides which are slotted to receive the flexible tube, resilient means urging one slide relative to the other to clamp and thereby stop flow through the tube, stop means arresting movement of said slide at an operating position in which the tube is held captive but is not closed, and a normally energized solenoid holding said stop means in stop position, said solenoid being so energized from the aforesaid detecting means that either detection of said deviation or failure of the electrical power supply deenergizes the solenoid and permits movement of the slide to close the flexible tube.

11. A drop monitor as defined in claim 1, comprising a clamp assembly with handles and jaws dimensioned to be readily spread apart by said handle and then clamped resiliently about a drop chamber, said jaws carrying electrodes which are spaced apart axially along and outside the drop chamber, and further comprising a shut-off mechanism operable to squeeze and thereby close a flexible tubing leading from the drop chamber to a hollow needle, and means responsive to detection of said deviation to operate said shut-off mechanism.

12. A drop monitor as defined in claim 1, in which the circuitry is responsive to a drop rate which falls below a desired value, and further includes an RC circuit, means to charge the capacitor of the RC circuit, means whereby the aforesaid modulation occurrences discharge the capacitor of the RC circuit, and means whereby building up of an excessive charge on the capacitor serves to cause the alarm operation.

13. A drop monitor as defined in claim 1, in which the circuitry is responsive to a drop rate which falls below a desired value, and further includes an RC circuit, means to charge the capacitor of the RC circuit, and means whereby the aforesaid modulation occurrences discharge the capacitor of the RC circuit, means to adjust the resistance of the RC circuit as an adjustment of rate, and means whereby building up of an excessive charge on the capacitor serves to cause the alarm operation.

14. A drop monitor as defined in claim 1, in which the electronic circuitry is responsive to too low a drop rate to cause energization of the alarm, said circuitry including a means responsive to an excessive drop rate serving to then block the transmission of the aforesaid modulation occurrences in order to cause the alarm operation.

15. A drop monitor as defined in claim 1, in which the circuitry is responsive to a drop rate which falls below a desired value, and an RC circuit, means to charge the capacitor of the RC circuit, means whereby the aforesaid modulation occurrences discharge the capacitor of the RC circuit, means whereby building up of an excessive charge on the capacitor serves to energize the alarm, and in which the electronic circuitry includes means responsive to an excessive drop rate to cause the alarm operation, said responsive means serving to then block the transmission of the aforesaid modulation occurrences in order to prevent discharge of the capacitor of the RC circuit.

16. A drop monitor as defined in claim 1, comprising a clamp assembly with resilient closing means and handles and jaws dimensioned to be readily spread apart by said handles and then clamped resiliently about a drop chamber, said jaws carrying electrodes which are spaced apart axially along and outside the drop chamber, and insulation means for at least one of said electrodes to insulatedly mount said electrode on its jaw.

17. A drop monitor as defined in claim 1, further comprising a shut-off mechanism operable to shut off flow through a flexible tube leading from the drop chamber to a hollow needle, and means responsive to said modulation occurrence deviation to operate said shut-off mechanism, said shut-off mechanism comprising two superposed slides, each slide having a transverse slot which is open at one end to receive the tube, one slot having an offset enlargement at its inner end, resilient means for each slide to urge it in one direction, independently operable stop means for each of the slides, the proportioning and location of the said slots and stops being such that the slides may assume any of three relative positions, one relative position serving to register the slots and thereby to open the slots for insertion or removal of the tube, another relative position having one slide somewhat displaced from the other slide to partly close the open ends of the slots and to thereby retain the tube in the slides without clamping the tube, and the third relative position having the slides so displaced as to squeeze the tube flat and to thereby arrest further flow therethrough.

18. A drop monitor as defined in claim 17, in which one of the stops is manually operable to cause the slides to hold the first relative position.

19. A drop monitor as defined in claim 17, in which there is a solenoid to operate one of the stops, said solenoid when energized causing its stop to hold the slides in the second relative position.

20. A drop monitor as defined in claim 17, in which there is a solenoid to operate one of the stops, said stop being released when the solenoid is deenergized, and means whereby the alarm operation deenergizes the solenoid, thereby causing the slides to assume the third relative position.

21. A drop monitor as defined in claim 17, which further comprises a clamp assembly with resilient closing means and handles and jaws dimensioned to be readily spread apart by said handles and then clamped resiliently about a drop chamber, said jaws carrying the aforesaid electrodes which are spaced apart axially along and outside the drop chamber, and insulation means for at least one of said electrodes to insulatedly mount said electrode on its jaw.

References Cited

UNITED STATES PATENTS

| | | | |
|---|---|---|---|
| 2,704,342 | 3/1955 | Fielden. | |
| 3,163,176 | 12/1964 | Darling. | |
| 3,197,068 | 7/1965 | Corbin et al. | |
| 3,199,026 | 8/1965 | Liebowitz | 324—127 |
| 3,284,788 | 11/1966 | Hudson | 340—239 |

THOMAS B. HABECKER, Primary Examiner

PERRY PALAN, Assistant Examiner

U.S. Cl. X.R.

128—214; 317—246; 331—65; 340—200, 208, 239, 258